Nov. 12, 1957
R. E. SATTLER ET AL
2,812,830
DEHYDRATION OF GASES
Filed April 30, 1956
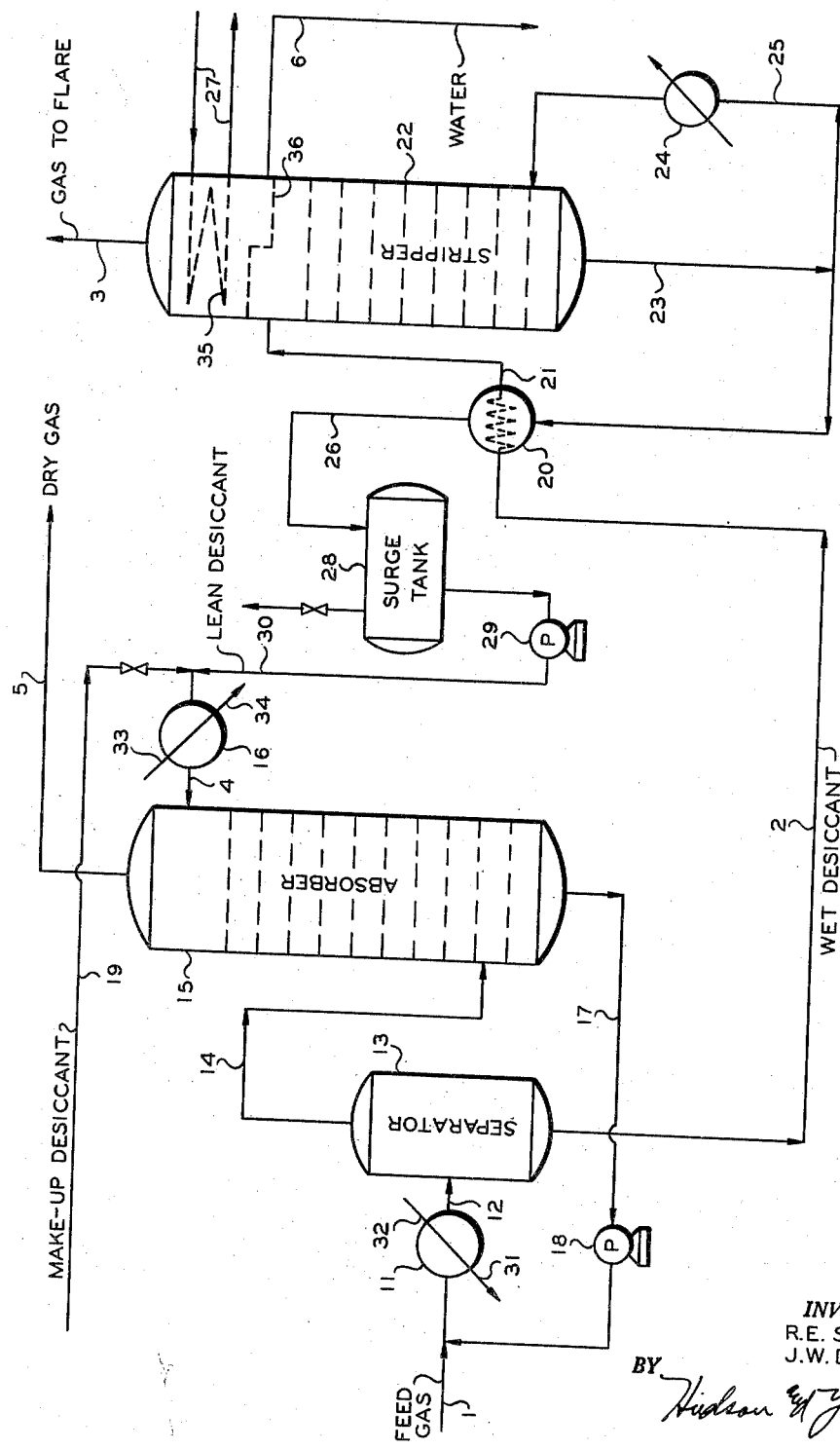
INVENTORS
R.E. SATTLER
J.W. DAVISON
BY Hudson & Young
ATTORNEYS 2,812,830

DEHYDRATION OF GASES

Robert E. Sattler and Joseph W. Davison, Bartlesville, Okla., assignors to Phillips Petroleum Company, a corporation of Delaware Application April 30, 1956, Serial No. 581,759

10 Claims. (Cl. 183—120)

This invention relates to the dehydration of gases. In one aspect it relates to an improved method of operating a system of dehydration of a gas with a liquid desiccant. In another aspect it relates to a method for the operation of a system for dehydration of a gas with a desiccant glycol.

In conventional glycol dehydrating systems, gas to be dried enters the bottom of an absorber and is contacted countercurrently with the glycol. The water-rich glycol from the absorber is then fed to a stripper, usually a packed column, in which the absorbed water is stripped for removal as an overhead product. The lean glycol, that is, the glycol depleted of its water content, from the bottom of the stripper is cooled by heat exchange with the stripper feed and by an external cooling medium, and is then recycled to the top of the absorber. The absorber usually has only a few vapor-liquid contacting trays, generally four. In an absorber of this type intercooling of the absorbent is impractical. When high pressure gases are to be dried to low dew points, frequently large amounts of water must be removed in the absorber since the amount of water which can be removed by cooling the wet gas, in case the gas is a hydrocarbon gas, is limited by the formation of gas hydrates. Thus, to obtain dry gases having low dew points, both low temperature and high glycol concentrations are required. The main body of gas to be treated must be cool while passing through the absorber. These two requirements, (1) relatively large amounts of water to be removed and (2) the need to cool the gas stream, result in a large heat release in the absorber. Since it is impractical to intercool the conventional absorber and since the inlet gas stream, that is, a hydrocarbon gas stream, cannot be cooled below its hydrate formation point, the conventional solution to the problem is to circulate large quantities of high concentration glycol, that is glycol having a low water content, through the system. The circulation of large quantities of glycol of course results in use of large pumps, heat exchangers, coolers, etc.

An object of our invention is to provide an improved process for the operation of a hydration system involving use of a liquid desiccant.

Another object of our invention is to provide an improved dehydration system using a liquid desiccant and in which the above-mentioned disadvantages of conventional systems are eliminated.

Another object of our invention is to provide a dehydrating system employing a liquid desiccant and requiring circulation of relatively small volumes of the desiccant.

Yet another object of our invention is to provide such a system employing much smaller equipment than conventionally required for dehydrating similar volumes of gas.

Still other objects and advantages of our invention will be realized upon reading the following description, which, taken with the attached drawing, forms a part of this specification.

In the drawing the figure illustrates, in diagrammatic form, one assembly of apparatus parts suitable for the practice of our invention.

We achieve the above-mentioned and other objects and advantages by providing a process for dehydrating a gas containing moisture with a liquid desiccant wherein said gas and desiccant are mutually chemically inert, the improvement comprising mixing said gas with said liquid desiccant containing previously absorbed moisture and as subsequently produced, from said mixing operation separating a gas phase from a liquid phase, contacting said gas phase with said liquid desiccant lean in absorbed moisture in an absorption operation wherein moisture is absorbed by this latter mentioned desiccant, from this absorption operation withdrawing dehydrated gas as the main product of the process, withdrawing desiccant containing absorbed moisture from said absorption operation and passing same to the above-mentioned mixing operation as said liquid desiccant containing absorbed moisture as subsequently produced.

We will explain the apparatus parts of the drawing in conjunction with the explanation of the operation of the process. Moisture-containing feed gas from a source, not shown, is fed to our system through a pipe 1. Absorbent triethylene glycol is introduced into pipe 1 from a pipe 17 under the influence of a pump 18. The triethylene glycol and the feed gas are intended to be at least reasonably well mixed after introduction of the glycol into the gas in pipe 1 and on their passage into a heat exchanger 11. Refrigerant from a zone, not shown, enters this heat exchanger through a pipe 32 and leaves the exchanger through a pipe 31. It is intended that the heat of absorption or solution of the moisture from the feed gas in the glycol be removed in this heat exchanger. However, in the example given herein, the feed gas in pipe 1 has a temperature of about 70° F., the glycol from pipe 17 has a temperature of about 61° F., and sufficient heat is removed in exchanger 11 so that the partially dehydrated gas and glycol flowing through a pipe 12 has a temperature of about 45° F. In a separator 13 liquid glycol containing moisture in solution is separated from the gas, the latter being passed on through a pipe 14 into an absorber 15. This absorber 15 is provided with conventional vapor-liquid contacting apparatus, such as bubble cap trays or the like. Lean absorbent triethylene glycol is introduced into the top of the absorber through a pipe 4, and thus the gas feed and the glycol are countercurrently contacted in the absorber. Dry gas is removed from the top of the absorber through a pipe 5 as the main product of the process and for such disposal as desired. Absorbent glycol containing absorbed moisture is removed through pipe 17 for mixing with the feed gas as above mentioned. The absorbent glycol on flowing through exchanger 11 at the relatively low temperature mentioned absorbs an appreciable amount of moisture from the feed gas so as to reduce the moisture absorption load in the absorber 15. In this manner the temperature increase of the absorbent on flowing through absorber 15 is greatly minimized with the result that a relatively dry gas is removed from the absorber through pipe 5. Furthermore, the circulation rate of the absorbent is relatively low when using this two-step absorption system because of the lowered temperature obtained in exchanger 11.

The absorbent glycol with its load of absorbed water is withdrawn from separator 13 through a pipe 2, is heated in exchanger 20 and then is passed on through a pipe 21 into the upper portion of a stripper vessel 22. This stripper vessel is also provided with conventional vapor-liquid contacting apparatus such as bubble cap trays or the like. Kettle product is removed from the bottom of stripper 22 through a pipe 23, a portion being circulated through a pipe 25 and a reboiler heat exchanger 24 for providing reboiling or stripper heat to the stripper 22. Heating medium for the heater 24 can be provided from any suitable source desired. Small quantities of absorbed gases which are stripped from the absorbent are removed through a pipe 3 for such disposal as desired. A condensing coil 35 is provided in the upper portion of stripper 22 to condense the stripped water, and coolant for operating this condenser enters and leaves the condensing coil 35 through pipes 27. Condensed water collects on a take-off tray 36, and the water collected therein is removed through a pipe 6 for such disposal as desired.

The portion of the stripped absorbent not required for reboiling purposes is passed through a pipe 26 and through heat exchanger 20 for imparting heat to the wet desiccant entering the stripper and for cooling the stripped absorbent. The cooled lean absorbent is passed on through pipe 26 into a surge tank 28. Lean absorbent from this tank is passed by a pump 29 through a pipe 30 into a cooler 16 for final cooling prior to introduction into the absorber. Liquid absorbent for starting up the system and make-up absorbent, as required, is introduced into the system through a pipe 19. In the example given herein, the lean absorbent in the bottom of stripper 22 has a temperature of about 340° F. and the portion of the absorbent passed through exchanger 20 is cooled to about 55° F. In cooler 16 the temperature of the absorbent is decreased to about 45° F. for introduction into the absorber. Refrigerant for this final cooling step enters the cooler through a pipe 33 and leaves through a pipe 34.

The refrigerant required in the operation of cooler 16 is provided from any suitable source, such as an external refrigeration system; or, if desired, the dry gas flowing through pipe 5 can be passed through a pressure reducing system in which low temperature gas is produced, and this low temperature gas can, if desired, supply the refrigeration for exchangers 11 and 16. Such operation of course is possible in case the gas passing through pipe 1 has sufficiently high pressure and if the final dry gas of the system is not required to have a correspondingly high pressure.

We have hereinabove mentioned triethylene glycol as a suitable liquid desiccant for use in our process. Other suitable liquid desiccants can be used, such as diethylene glycol or glycol (ethylene glycol). Certain alcohols such as normal butyl alcohol, isobutyl alcohol, methyl Carbitol and the like can also be used as desiccant in our system.

One requirement of a desiccant obviously is that it must be relatively inert to the gas being treated. Likewise, the desiccant preferably should be noncorrosive to conventional steel equipment so that special chemically resistant equipment need not be used.

In Table I are given, for exemplary purposes, compositions of a moisture containing feed gas and of materials in process at several points in the system.

TABLE I

| Materials, Mols per Stream Day | Compositions at Various Process Points, Mols per Stream Day | | | | | |
|---|---|---|---|---|---|---|
| | 1 | 2 | 3 | 4 | 5 | 6 |
| $H_2$ | 4,232 | | | | 4,232 | |
| $CH_4$ | 17,613 | 2 | 2 | | 17,611 | |
| $C_2$ Hydrocarbons [1] | 16,679 | | | | 16,679 | |
| $C_3$ Hydrocarbons [2] | 5,207 | | | | 5,207 | |
| $C_4$ Hydrocarbons [3] | 60 | | | | 60 | |
| Liq. Desiccant [4] | | 74 | | 74 | | |
| Water | | 52 | 68 | | 19 | 3 | 49 |
| Total: | | | | | | |
| Lbs | 986,100 | 12,320 | 32 | 11,400 | 985,180 | 888 |
| Gals | | 1,318 | | 1,211 | | 107 |
| Mols | 43,843 | 144 | 2 | 93 | 43,792 | 49 |
| M cu. ft | 16,616 | | 0.9 | | 16,597 | |

[1] Ethylene, ethane, acetylene.
[2] Propadiene, methyl acetylene, propylene, propane.
[3] Butadiene, butylene, n-butane.
[4] Triethylene glycol.

In Table II are given pressures and temperatures at various process points in the system when treating the feed gas illustrated in Table I.

TABLE II

| Apparatus Part (Ref. numeral) | Temp., °F. | Pressure, lbs. Per sq. in. abs. |
|---|---|---|
| 1 | 70 | 443 |
| 12 | 45 | |
| 13, 14 | 45 | 442 |
| 15 Top, 5 | 45 | 441 |
| 15 Bottom, 17 | 61 | 441 |
| 21 | 303 | |
| 22 Top, 3 | 160 | 20 |
| 22 Bottom, 23 | 340 | 20 |
| 27 | 86 | |
| 26 | 55 | |
| 28 | 55 | 4.7 |
| 30 | 75 | |
| 4 | 45 | |
| 32, 33 | −28 | |
| 31, 34 | 35 | |

The feed gas illustrated in Table I, it is noted, contains several $C_2$ hydrocarbons and also several $C_3$ and $C_4$ hydrocarbons. Such a gas is a cracked product of an operation for the production of ethylene. While we have illustrated our process for the dehydration of such a cracked gas, it is obvious that the process is equally applicable for the dehydration of other gases, such as a natural gas. When a natural gas is being dehydrated, the gas can be what is termed a wet gas or a dry gas, that is, as regards content of gasoline boiling range hydrocarbons. These terms, wet or dry, when considered in the light of gasoline boiling range hydrocarbons have no reference whatever to moisture content. In addition to cracked gases or natural gases, our system can be used for dehydrating such other gases as hydrogen, nitrogen, carbon dioxide, or any other gas which needs to be dehydrated and which is chemically non-reactive with the dehydrating agent.

Such auxiliary equipment as valves, pressure and temperature indicating, recording, and control equipment; flow indicating, recording and control equipment and the like are not disclosed nor described for purposes of brevity. The need for such auxiliary equipment, its installation and use are well understood by those skilled in the art.

While use of cooler 11 as hereinbefore disclosed is preferred, it is not essential to the operation. For example, the desiccant flowing in pipe 17 can be cooled sufficiently to maintain the proper temperature in the separator 13. If desired, the feed gas in pipe 1 can also be cooled prior to entry of desiccant from pipe 17 into pipe 1. The limiting factor for cooling the feed gas as mentioned hereinbefore is hydrate formation.

While certain embodiments of the invention have been described for illustrative purposes, the invention obviously is not limited thereto.

We claim:
1. In a process for dehydrating a gas containing moisture with a liquid desiccant, the improvement comprising mixing said gas with said liquid desiccant containing previously absorbed moisture and as subsequently produced, cooling the mixture to remove heat of absorption of moisture in said desiccant produced in the mixing operation, passing this cooled mixture into a phase separation zone and therein separating a gas phase from a liquid phase, contacting said gas phase with said liquid desiccant lean in absorbed moisture in a countercurrent absorption operation wherein moisture is absorbed by this latter mentioned desiccant, from this absorption operation withdrawing dehydrated gas as the main product of the process, withdrawing desiccant containing absorbed moisture from said absorption operation and passing same to the above mentioned mixing operation as said liquid desiccant containing absorbed moisture as subsequently produced, stripping absorbed moisture from the liquid phase separated in said separation zone, cooling the stripped liquid phase and introducing the cooled stripped liquid phase into said absorption operation as said liquid desiccant lean in absorbed moisture.

2. In the process of claim 1 wherein the liquid desiccant comprises triethylene glycol.

3. In the process of claim 1 wherein the liquid desiccant comprises diethylene glycol.

4. In the process of claim 1 wherein the gas being dehydrated comprises a natural gas.

5. In the process of claim 1 wherein the gas being dehydrated comprises a cracked gas.

6. In a process for dehydrating a gas containing moisture with a liquid desiccant, the improvement comprising mixing said gas with said liquid desiccant containing previously absorbed moisture and as subsequently produced, passing this mixture into a phase separation zone and therein separating a gas phase from a liquid phase, contacting said gas phase with said liquid desiccant lean in absorbed moisture in a countercurrent absorption operation wherein moisture is absorbed by this latter mentioned desiccant, from this absorption operation withdrawing dehydrated gas as the main product of the process, withdrawing desiccant containing absorbed moisture from said absorption operation and passing same to the above mentioned mixing operation as said liquid desiccant containing absorbed moisture as subsequently produced.

7. The process of claim 6 wherein the desiccant is triethylene glycol.

8. The process of claim 6 wherein the desiccant is diethylene glycol.

9. The process of claim 6 wherein the gas being dehydrated comprises a natural gas.

10. The process of claim 6 wherein the gas being dehydrated comprises a cracked gas.

References Cited in the file of this patent

UNITED STATES PATENTS

| | | |
|---|---|---|
| 2,151,248 | Vaughan | Mar. 21, 1939 |
| 2,235,322 | Martin | Mar. 18, 1941 |